Feb. 8, 1955
H. DORSEY
2,701,516
BASTING APPARATUS FOR FOOD COOKING MACHINES
Filed Aug. 27, 1951
2 Sheets-Sheet 1
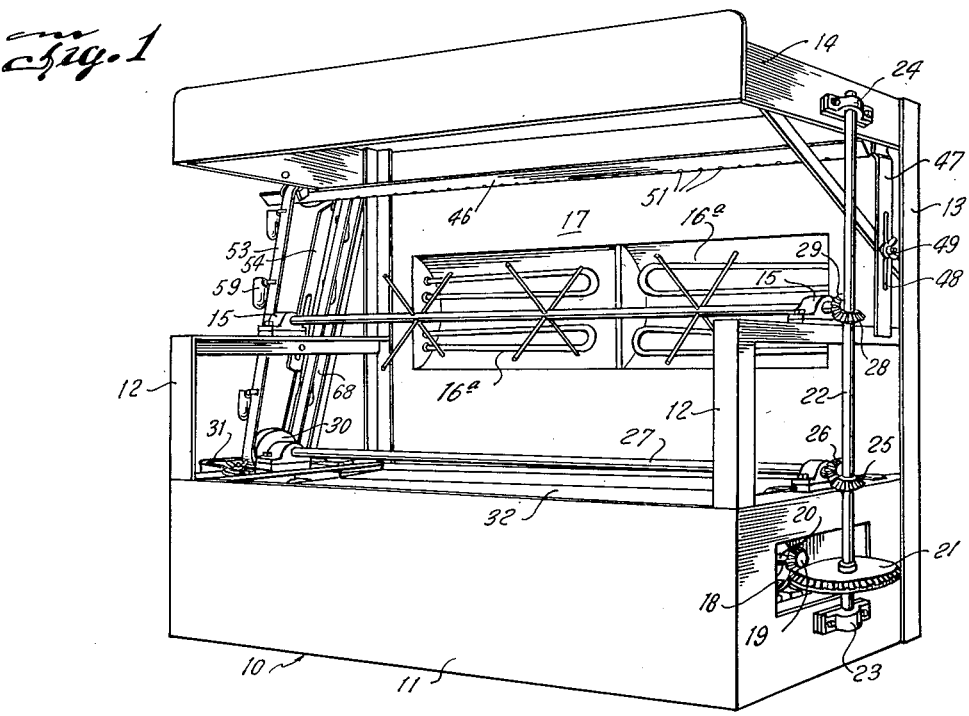
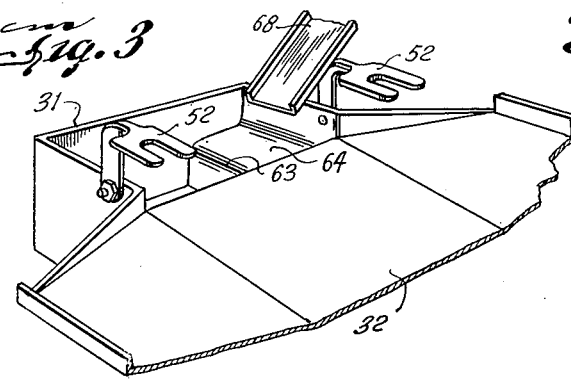
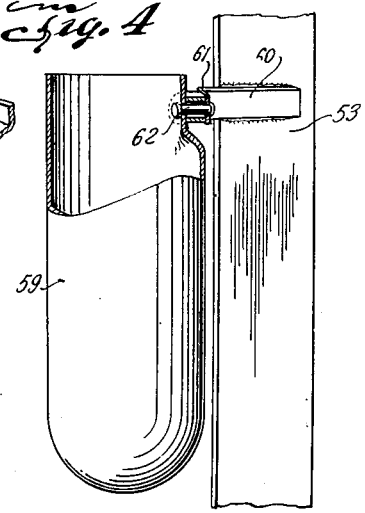
HUGH DORSEY
INVENTOR.
ATTORNEY Feb. 8, 1955  H. DORSEY  2,701,516
BASTING APPARATUS FOR FOOD COOKING MACHINES
Filed Aug. 27, 1951  2 Sheets-Sheet 2

HUGH DORSEY
INVENTOR.

BY
ATTORNEY

United States Patent Office 2,701,516
Patented Feb. 8, 1955

2,701,516
BASTING APPARATUS FOR FOOD COOKING MACHINES

Hugh Dorsey, Lamesa, Tex.

Application August 27, 1951, Serial No. 243,787

6 Claims. (Cl. 99—346)

This invention relates to food cooking and barbecuing apparatus and has particular reference to new and useful improvements in mechanism for conveying basting liquids and sauces during operation of the cooking and barbecuing apparatus.

The principal object of the invention is to provide a basting mechanism which is wholly automatic and sanitary and designed to operate in conjunction with a machine for cooking and barbecuing foods. The basting mechanism does not in any way interfere with the performance of the cooking apparatus and in addition to conveying basting liquids to a point for distribution over the foods during the cooking operation, the mechanism is effective to continuously mix the ingredients of the sauce used in basting which are of such characteristics that they do not normally remain in suspension.

Another object of the invention is to provide a basting mechanism for a barbecuing machine consisting of an endless belt or metal tape which will not readily collect foreign matter and which may be conveniently cleaned of any accumulated substances, said belt operating over vertically spaced rollers and adapted to carry, at spaced intervals, a plurality of buckets which are pivoted to the belt so that they will remain in upright position except when tilted to receive basting liquid from a sump at their lowest position and when they are again tilted at their highest position they deposit the liquid into a distributing trough. By maintaining the buckets in upright position on the downgoing side of the conveyor, residue liquid is prevented from flowing from the buckets onto adjacent parts of the machine to create an unsanitary condition.

Another object of the invention is to provide a basting mechanism for barbecuing machines which has in conjunction therewith a sump provided with a raised bottom portion defining a shoulder against which each bucket is brought to tilt the same to a position to receive the basting liquid and during the process, the liquid will be agitated to mix the ingredients thereof. The conveyor has further associated therewith an inclined chute adapted to receive drippings from the walls of the buckets on the upgoing side of the conveyor and to convey these drippings back into the sump.

With the foregoing objects in view, the invention has further reference to certain features of accomplishment which will become apparent as the description proceeds, taken in connection with the accompanying drawings wherein:

Figure 1 is a front perspective view of a barbecuing machine showing the invention mounted thereon.

Figure 3 is a fragmentary perspective view of the drain pan adapted to be disposed under the spits of the barbecuing machine and showing the basting liquid sump in conjunction therewith.

Figure 4 is a fragmentary view of the endless conveyor belt showing a bucket pivoted thereto and partly in section; and, Figure 5 is a perspective view of the mounting member for the upper conveyor roller and which serves to support one end of the basting liquid distributing trough.

Figure 2:
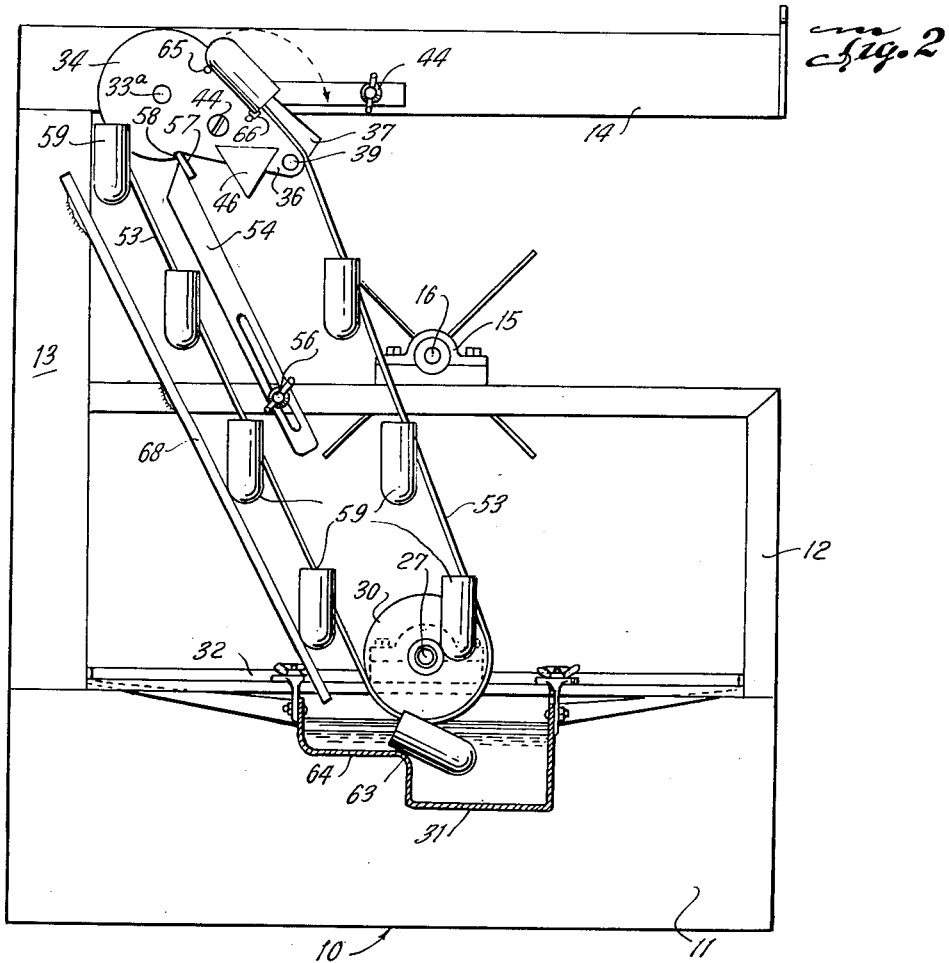
Figure 2 is an end elevational view of the barbecuing machine revealing the basting liquid sump in section and disclosing the manner in which the conveyor buckets are submerged in the liquid in the sump.

Continuing with a more detailed description of the drawing, reference numeral 10 denotes generally the food cooking and barbecuing machine on which the invention is adapted to operate. Briefly, the machine consists of an enclosed base portion 11 on which is mounted end frames 12 and the rear frame 13, the latter supporting a canopy 14. Mounted on each of the end frames 12 is a bearing 15 and journaled in these bearings are the ends of a spit 16, on which is mounted the food to be cooked by means of heat supplied by electric coil heaters, not shown, suitably arranged on the rear panel 17 which is supported by the rear frame 13 of the machine. A motor 18 has a gear 19 mounted on its armature shaft 20. The gear 19 operates a larger gear 21 mounted on the vertical shaft 22 whose ends are journaled in bearings 23 and 24 mounted respectively on the base portion 11 and on the canopy 14 of the machine. The shaft 22 also carries a gear 25 which operates a gear 26 mounted on one end of a horizontal shaft 27 below and parallel with the spit 16 and to which further reference will be made presently. The spit 16 is driven by a gear 28, mounted on the vertical shaft 22 and which engages a similar gear 29 mounted on the end of the spit 16.

Referring now to the elements of the invention, reference numeral 30 denotes a wheel or pulley mounted on the end of shaft 27 opposite the gear 26. The lower portion of the wheel 30 extends into a sump 31. The sump 31 is formed integrally with one end of an inclined drain pan 32 which is situated in the upper portion of the base 11 of the machine immediately below the position of the food support on the spit 16 and is adapted to collect drippings from the food in the process of cooking and to convey these drippings into the sump 31 and in this sump is also placed the ingredients of an appropriate sauce which is adapted to be distributed onto the food being cooked in a manner to be described.

Figure 5:
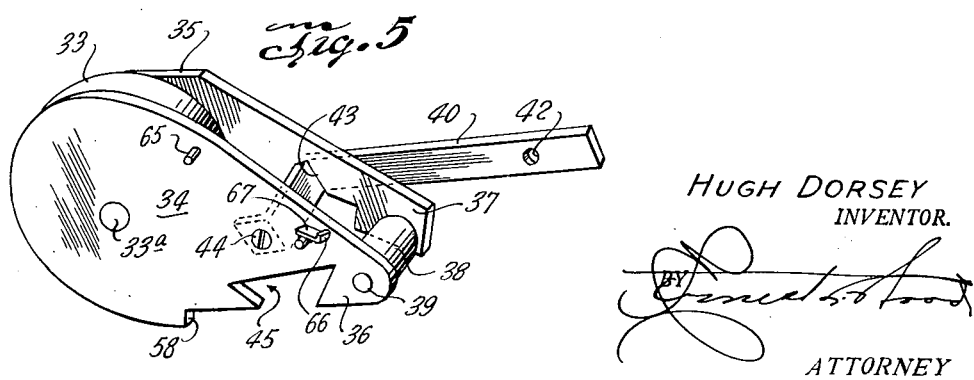

In Figure 5 is shown in detail a mounting for an upper wheel or pulley 33. This mounting consists of a pair of parallel plates 34 and 35. The outer plate 34 has an extension 36 which is in parallelism with a similar extension 37 of the companion plate 35 and operating between these extensions, at their outer ends, is a roller 38, mounted on a stub shaft 39. Supporting the plates 34 and 35 is an arm 40 which is secured to one end of the canopy 14 by means of a bolt 41, extending through an aperture 42 in the arm 40 which registers with a similar aperture in the canopy 14 and to constitute a pivot about which the pulley mounting is rotatable in a manner to be presently explained. One end of the arm 40 is bent at right angles to extend through an opening 43 in the plate 35 and is again bent at right angles to bear flush against the inner face of the plate 34 and is secured thereto by means of a screw 44.

The plate 34 has a dovetailed recess 45 provided in its extension 36. This recess is adapted to receive one end of the substantially triangularly shaped trough 46, the latter extending in parallelism with and above the spit 16, its opposite end being supported by a strap 47, adapted to be vertically adjusted through the medium of a longitudinal slot 48 and a bolt 49 which extends through the slot and is secured to an angular bracing member 50 which is a part of the machine 10. Vertical adjustment of the strap 47 effects adjustment in the angle of the trough 46, which latter has a series of longitudinally spaced perforations 51 in the bottom thereof through which basting liquid is distributed onto the food supported on the spit 16 and from whence the basting liquid drops into the drain pan 32 for reception by the sump 31.

The drain pan 32 is suspended from the upper portion of the base member 11 of the machine at its ends by means of bifurcated arms 52 which are fastened to and extend upwardly from the sump 31, as shown in Figure 3.

In order to convey basting liquid from the sump 31 to the trough 46, the endless bucket conveyor is provided, consisting of a steel band 53 forming a belt adapted to operate over the pulleys 30 and 33, the latter being mounted on shaft 33a between plates 34 and 35. A roller 38 constitutes an idle roller over which the belt 53 is tensioned by means of an arm 54. The arm 54 has a longitudinal slot 55 therein through which is passed a bolt 56, the latter being secured to the top of an end frame 12. The upper end of the arm 54 carries a cross-member 57 which engages the shoulder 58 defined by a cut-out portion in the plate 34 adjacent the dovetailed recess 45 in the extension 36 of the plate. By loosening the screw 56 and manipulating the arm 54, the mounting member consisting of the plates 34 and 35 may be raised or lowered on its pivot 41, thus varying the tension on the belt 53. The arm 54 also constitutes a support for the pulley mounting auxiliary to the bolt 41 on which it is pivoted.

At spaced intervals about the belt 53 are pivoted buckets 59. In Figure 4 is shown the means in which the buckets are connected to the belt. This means consists of a strap 60 which is welded to the belt and has an upturned outer end 61, forming an ear supporting a pin 62 which extends through one side of the bucket 59 to serve as a pivotal connection. In this manner, the buckets will maintain an upright position both on the upgoing as well as on the downgoing side of the conveyor.

As the buckets move downwardly and under the pulley 30, they are successively brought up against a shoulder 63 defined by a raised portion 64 in the bottom of the sump 31. As the buckets enter the sump and are submerged in the basting liquid therein, they agitate the liquid to mix the ingredients making up the sauce constituting the liquid and as the buckets are drawn upwardly onto the shoulder 63, they assume a horizontal position to receive a quantity of the liquid and as the buckets continue in their travel, they resume an upright position which they maintain until they reach the upper pulley 33, at which point the side of each successive bucket is brought up against a pin 65 extending outwardly from the plate 34 on the pulley mounting. As the belt 53 continues to travel, the bucket 59 is inverted directly over the trough 46 so that the contents of the bucket will pour into the trough. At this position, the open end of the bucket is brought up against an upturned lip 66 formed on the projection 67 which is welded or otherwise secured to the face of the plate 34. Engagement with the lip 66 as the bucket travels, will cause the bucket to move in an arc as indicated by the dotted line in Figure 2, after which it will again assume an upright position in its course back to the sump 31.

After the buckets are passed through the sump 31, a small quantity of the liquid will adhere to the outer walls of each bucket. To intercept and return this liquid back to the sump, an inclined chute 68 is disposed alongside the path of the buckets on their upward travel and the lower end of this chute is removably attached to one edge of the sump 31.

Manifestly, the construction as shown and described is capable of some modification and such modification as may be construed to fall within the scope and meaning of the appended claims is also considered to be within the spirit and intent of the invention.

What is claimed is:

1. In combination with a barbecuing machine, a basting apparatus comprising a sump for basting liquid having an elevated portion in the bottom thereof, a first pulley mounted above said sump, a second pulley above said first pulley, a mounting for said second pulley comprising a plate on each side of said second pulley and supporting a shaft on which said second pulley is rotatably disposed, one of said plates having a dovetailed recess therein, a distributing trough having one end supported in said recess and the opposite end supported by said machine, an arm having one end attached to said pulley mounting and the other arm pivotally connected to said machine, a second arm having oscillatable connection with said machine and engaging said pulley mounting at its upper end to effect movement of said pulley mounting about its pivotal connection to said machine, a belt operating on said first and second pulleys, a series of buckets having pivotal connection with said belt at spaced intervels thereon and adapted to be brought successively through liquid in said sump and against the elevated portion in the bottom thereof to fill said buckets with liquid, means on said pulley mounting to rotate each of said buckets 360 degrees about their pivotal points above said distributing trough to deposit their contents into said trough and means adjacent the upgoing side of said belt for collecting and returning drippings from said buckets to said sump.

2. In combination with a barbecuing machine, a basting apparatus comprising a sump for basting liquid having an elevated portion in the bottom thereof a first shaft journaled above said sump, a first pulley mounted on said shaft above said sump, a second pulley above said first pulley, a mounting for said second pulley comprising a plate on each side of said second pulley and supporting a shaft on which said second pulley is rotatably disposed, one of said plates having a dovetailed recess therein, a distributing trough having one end supported in said recess and the opposite end supported by said machine, an endless metal band operating on said first and second pulleys, a series of buckets having pivotal connection with said band in normally upright position and at spaced intervals thereon and adapted to be brought successively through liquid in said sump and against the elevated portion in the bottom thereof to fill said buckets with liquid, spaced apart projections on said pulley mounting in the path of said buckets to first tilt said buckets successively in the direction of said trough and then to rotate each of said buckets 360 degrees about their pivotal points above said distributing trough to deposit their contents into said trough and means adjacent the upgoing side of said belt for collecting and returning drippings from said buckets to said sump.

3. In combination with a barbecuing machine, a basting apparatus comprising a liquid sump, a shaft journaled above said sump, a pulley on said shaft, a second shaft paralleling said first shaft above the same but laterally offset in relation thereto, a second pulley on said second shaft, an endless metallic band surrounding said first and second pulleys, a series of buckets pivoted to said band at spaced intervals for normally upright suspension, a plate on each side of said pulley, said plates having parallel extensions, a roller journaled between said extensions at their outer ends over which said band passes in its travel about said pulleys, a perforated trough parallel with said shafts and supported at one end in a recess in one of said plates, a pin protruding from said latter plate in the path of the buckets conveyed by said band to tilt said buckets in the direction of said trough, a projection on said latter plate adjacent said pin with which the open ends of said buckets are successively engaged to up-end the buckets over said trough and means for rotating said first shaft.

4. In combination with a barbecuing machine, a basting apparatus comprising a liquid sump, an upper and a lower pulley, an endless metal band surrounding said pulleys, a series of buckets pivotally suspended from said band in normally upright position and successively moved by said band through said sump to fill the same with liquid, a mounting for said upper pulley comprising a pair of plates enclosing the sides of said upper pulley and having parallel extensions, a roller journaled between said extensions adjacent their outer ends over which said band is adapted to travel, a distributing trough having one end supported on a recess in the extension of one of said plates and its opposite end supported from said machine, a pin protruding from said one of said extensions in the path of said buckets to tilt the same successively toward said trough, a projection adjacent said pin against which the open ends of said buckets are successively engaged to up-end and rotate said buckets 360 degrees about their pivotal axes to empty the contents thereof into said trough and means for rotating one of said pulleys to drive said band.

5. The structure of claim 4, means for rotating said pulley mounting about the axis of said upper pulley to raise and lower the outer ends of said extensions and said roller to adjust the tension on said band and means for securing said mounting rotating means in adjusted positions.

6. The structure of claim 4, in which the bottom of said sump is formed with different levels defining an intervening shoulder against which the buckets of said endless band engage in their passage from the low to the high level of said sump to dispose the buckets on their sides for filling as they move successively through said sump.

References Cited in the file of this patent

UNITED STATES PATENTS

| Number | Name | Date |
| --- | --- | --- |
| 190,845 | Gamble et al. | May 15, 1877 |
| 402,160 | Hogeland | Apr. 30, 1889 |
| 432,915 | Toohey | July 22, 1890 |
| 434,029 | Gale | Aug. 12, 1890 |
| 482,941 | Cavanagh | Sept. 20, 1892 |
| 762,488 | Neubauer | June 14, 1904 |
| 1,709,549 | Webber | Apr. 16, 1929 |
| 1,855,540 | Baker et al. | Apr. 26, 1932 |
| 2,182,225 | Garvis | Dec. 5, 1939 |
| 2,257,758 | Murch | Oct. 7, 1941 |

FOREIGN PATENTS

| Number | Country | Date |
| --- | --- | --- |
| 4,650 | Great Britain | A. D. 1888 |
| 25,267 | Great Britain | A. D. 1907 |